US008573282B2

(12) United States Patent　　(10) Patent No.: US 8,573,282 B2
Lin　　(45) Date of Patent: Nov. 5, 2013

(54) SIDE BAR DEVICE FOR A SUNSHADE ASSEMBLY

(75) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 13/427,022

(22) Filed: Mar. 22, 2012

(65) Prior Publication Data

US 2012/0241102 A1　Sep. 27, 2012

(30) Foreign Application Priority Data

Mar. 24, 2011　(TW) ................................ 00110145 A

(51) Int. Cl.
*B60J 3/00*　(2006.01)
(52) U.S. Cl.
USPC ..................................... 160/370.22; 160/23.1
(58) Field of Classification Search
USPC ........ 160/370.22, 23.1, 384, 399, 402, 290.1; 296/97.8, 142, 143
See application file for complete search history.

(56) References Cited

U.S. PATENT DOCUMENTS

| | | | | | |
|---|---|---|---|---|---|
| 1,958,695 | A | * | 5/1934 | Claus | 160/23.1 |
| 5,090,468 | A | * | 2/1992 | Tedeschi | 160/290.1 |
| 5,575,524 | A | * | 11/1996 | Cronk | 296/142 |
| 6,135,192 | A | * | 10/2000 | Suzuki et al. | 160/370.22 |
| 6,216,762 | B1 | * | 4/2001 | Lin | 160/370.22 |
| 7,188,659 | B2 | * | 3/2007 | Hansen et al. | 160/370.22 |
| 2007/0193697 | A1 | * | 8/2007 | Horvath | 160/23.1 |

* cited by examiner

*Primary Examiner* — David Purol
(74) *Attorney, Agent, or Firm* — Whyte Hirschboeck Dudek S.C.

(57) ABSTRACT

A side bar device is adapted to be connected to a retractable shade member of a sunshade assembly. The sunshade assembly includes a housing unit that is formed with a slot. The shade member has a free end portion disposed in the housing unit when the shade member is retracted and adapted to extend outwardly of the housing unit through the slot when the shade member is expanded. The side bar device includes a side bar member adapted to be connected to the free end portion of the shade member, and a cover member having a coupling segment that is coupled removably to the side bar member, and a cover segment that is adapted to be disposed outside the housing unit to cover separably the slot of the housing unit.

8 Claims, 9 Drawing Sheets

SIDE BAR DEVICE FOR A SUNSHADE ASSEMBLY

CROSS-REFERENCE TO RELATED APPLICATION

This application claims priority of Taiwanese Application No. 100110145, filed on Mar. 24, 2011.

BACKGROUND OF THE INVENTION

1. Field of the Invention

The invention relates to a side bar device, more particularly to a side bar device for a sunshade assembly.

2. Description of the Related Art

As shown in FIGS. 1 and 2, a conventional sunshade assembly 1 for a rear windshield of an automobile includes an engaging unit 10 that is disposed at bottom of the rear windshield, and that has a first engaging plate 101 and a second engaging plate 102 cooperating with the first engaging plate 101 to define a slot 103 therebetween that extends in a direction across the rear windshield. The conventional sunshade assembly 1 further includes a shade-retracting mechanism 11 disposed in the engaging unit 10, a sidebar 12 extending parallel to the slot 103, a retractable shade member 13 having a bottom end that is secured to the shade-retracting mechanism 11 and a top end 131 that is secured to the side bar 12, and a shade-expanding mechanism 14 connected to the side bar 12 and operable for lifting the side bar 12.

The shade-expansion bar 12 is made integrally of plastic through molding, and has an engaging portion 121, a connecting portion 122 and a shade-clipping portion 125. The engaging portion 121 extends along the slot 103, and has a width greater than that of the slot 103 such that the engaging portion 121 is able to engage the first and second engaging plates 101, 102 when the shade member 13 is retracted. The connecting portion 122 extends downwardly from the engaging portion 121 and defines an engaging groove 124 therein. The shade-clipping portion 125 extends from the connecting portion 122 and cooperates with the connecting portion 122 to define a shade-clipping groove 123 for clipping the top end 131 of the shade member 13 therein. The shade-expanding mechanism 14 includes a driving plate 141 that is driven rotatably by a motor (not shown), a pair of connecting arms 142 connected pivotally and respectively to opposite ends of the driving plate 141, a pair of foldable support arms 143, and a pair of connecting blocks 145 engaging the engaging groove 124. Each of the support arms 143 has one end connected pivotally to a free end of a respective one of the connecting arms 142, and another end connected pivotally to a respective one of the connecting blocks 145.

When the shade member 13 is retracted, the engaging portion 121 of the side bar 12 is disposed on the housing unit 10 and covers the slot 103 to prevent dust from falling therethrough. When the shade member 13 is being expanded by the shade-expanding mechanism 14, the driving plate 141 is driven by the motor to drive unfolding movement of the support arms 143, thereby lifting the side bar 12 from the engaging unit 10 and thus expanding the shade member 13.

During installation of the conventional sunshade assembly 1, since the width of the engaging portion 121 of the side bar 12 is greater than that of the slot 103, the side bar 12 must be installed after one of the first and second engaging plates 101, 102 is installed and before the other one of the same is installed. As a result, such a conventional sunshade assembly 1 cannot be applied to automobiles that have integrally-formed engaging units.

SUMMARY OF THE INVENTION

Therefore, the object of the present invention is to provide a side bar device for a sunshade assembly which provides the sunshade assembly a relatively high flexibility in use.

Accordingly, a side bar device of the present invention is adapted to be connected to a retractable shade member of a sunshade assembly. The sunshade assembly includes a housing unit that is formed with a slot. The shade member has a free end portion adapted to be disposed in the housing unit when the shade member is retracted and to extend outwardly of the housing unit through the slot when the shade member is expanded. The side bar device comprises a side bar member adapted to be connected to the free end portion of the shade member, and a cover member having a coupling segment that is coupled removably to the side bar member, and a cover segment that is adapted to be disposed outside the housing unit to cover separably the slot of the housing unit when the shade member is retracted.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
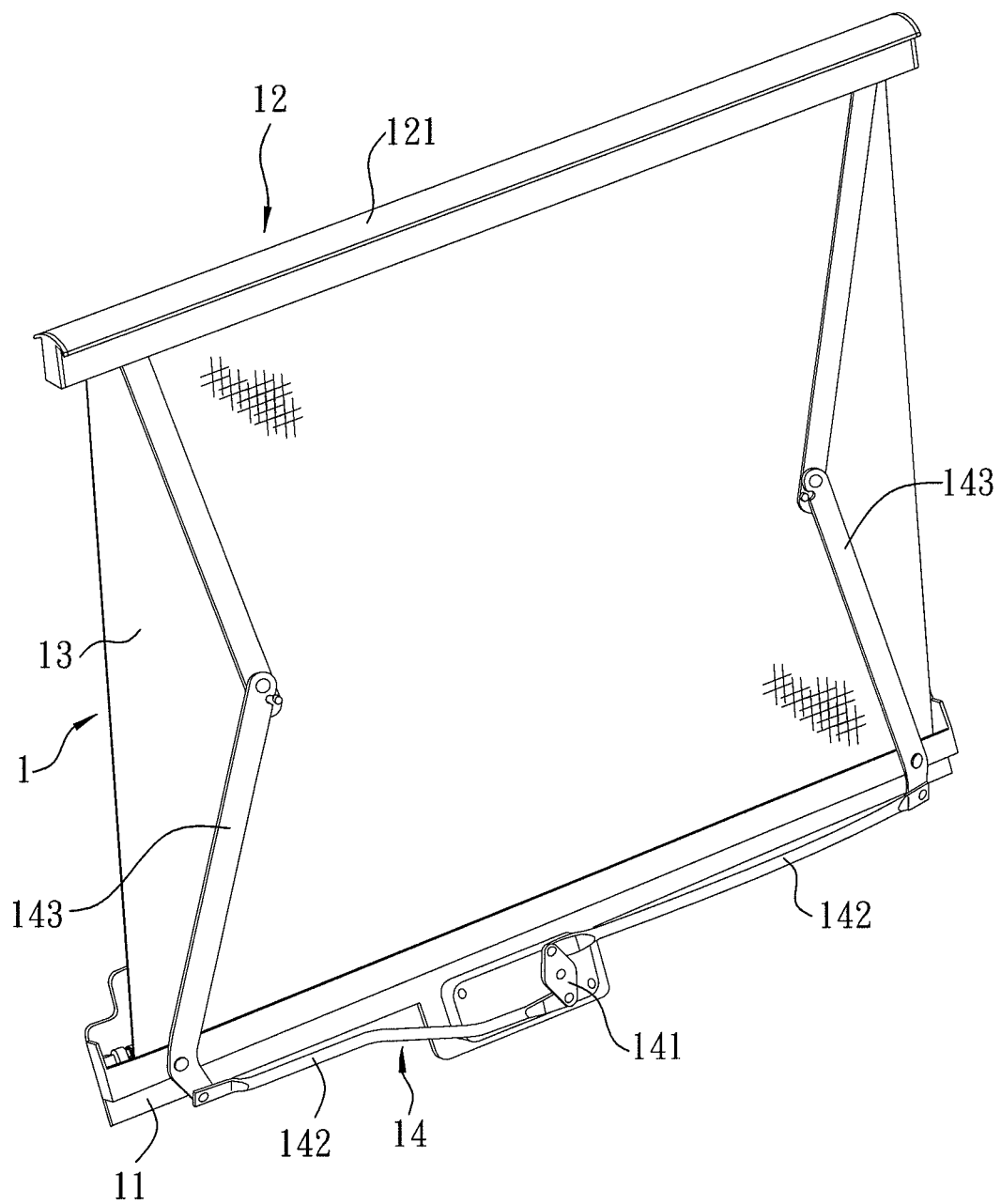
FIG. 1 is a partly perspective view of a shade member, a side bar and a shade-supporting mechanism of a conventional sunshade assembly.
Figure 2:
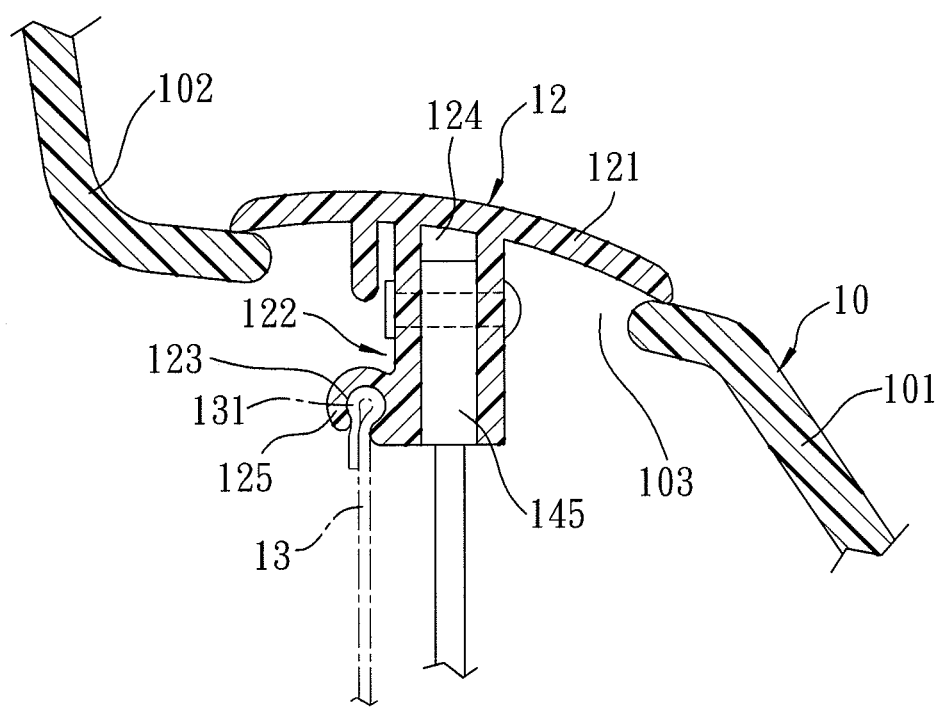
FIG. 2 is a fragmentary sectional view of the conventional sunshade assembly.

Before the present invention is described in greater detail, it should be noted that like elements are denoted by the same reference numerals throughout the disclosure.

Figure 3:
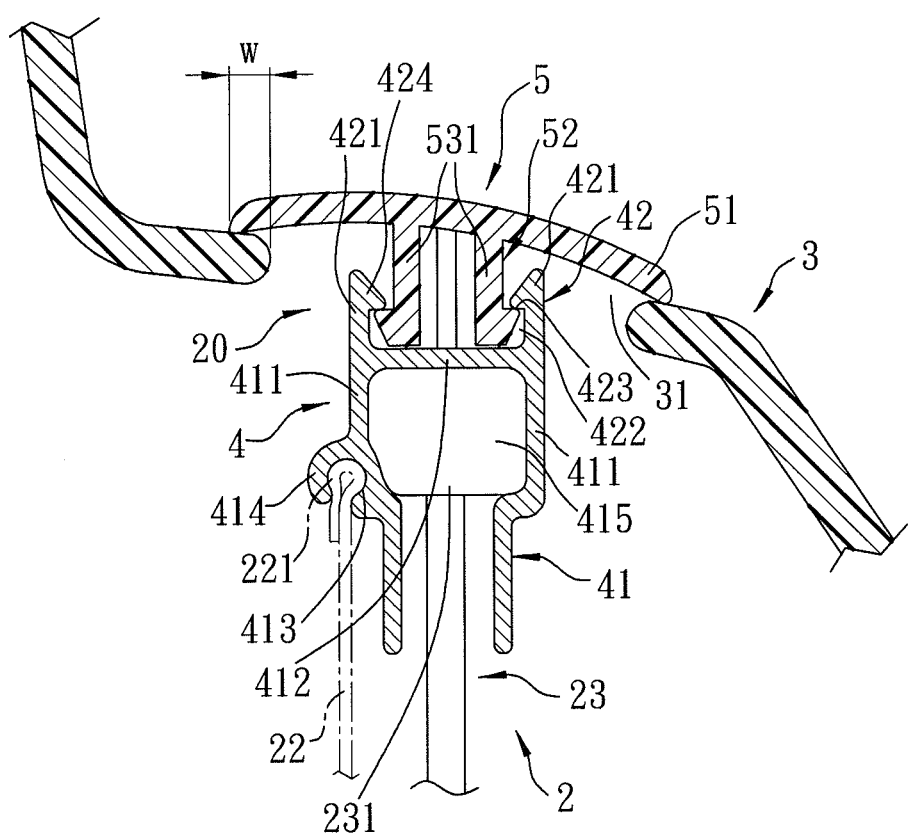
FIG. 3 is a fragmentary sectional view of a sunshade assembly mounted with a first preferred embodiment of a side bar device according to the invention.
Figure 4:
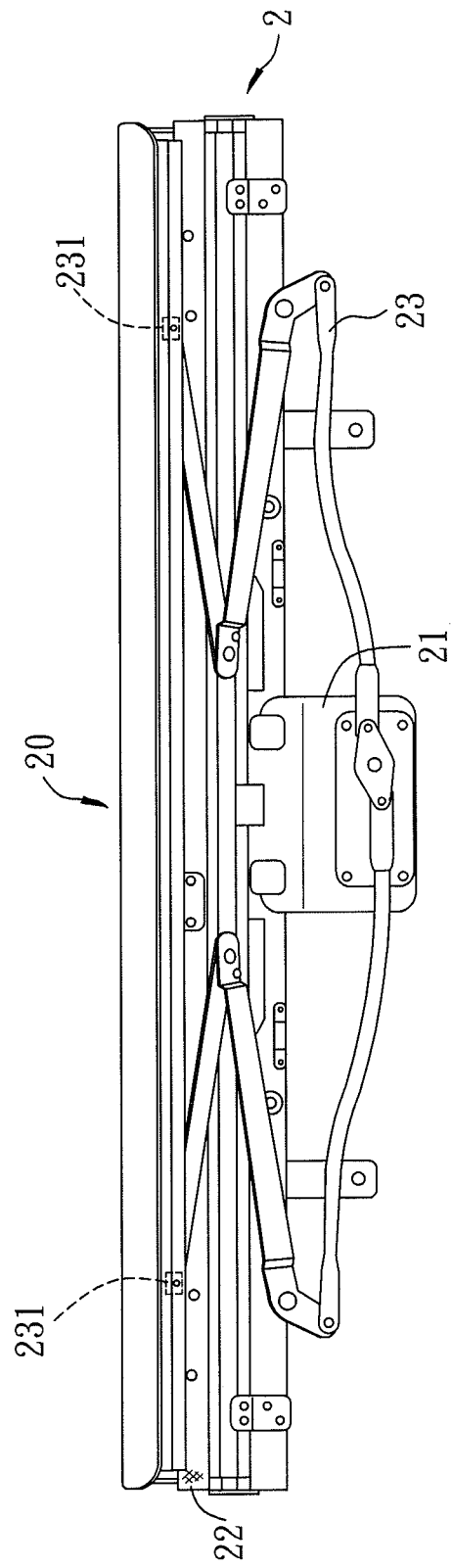
FIG. 4 is a side view of a shade member, the first preferred embodiment of the side bar device and a shade-supporting mechanism of the sunshade assembly when the shade member is retracted.
Figure 5:
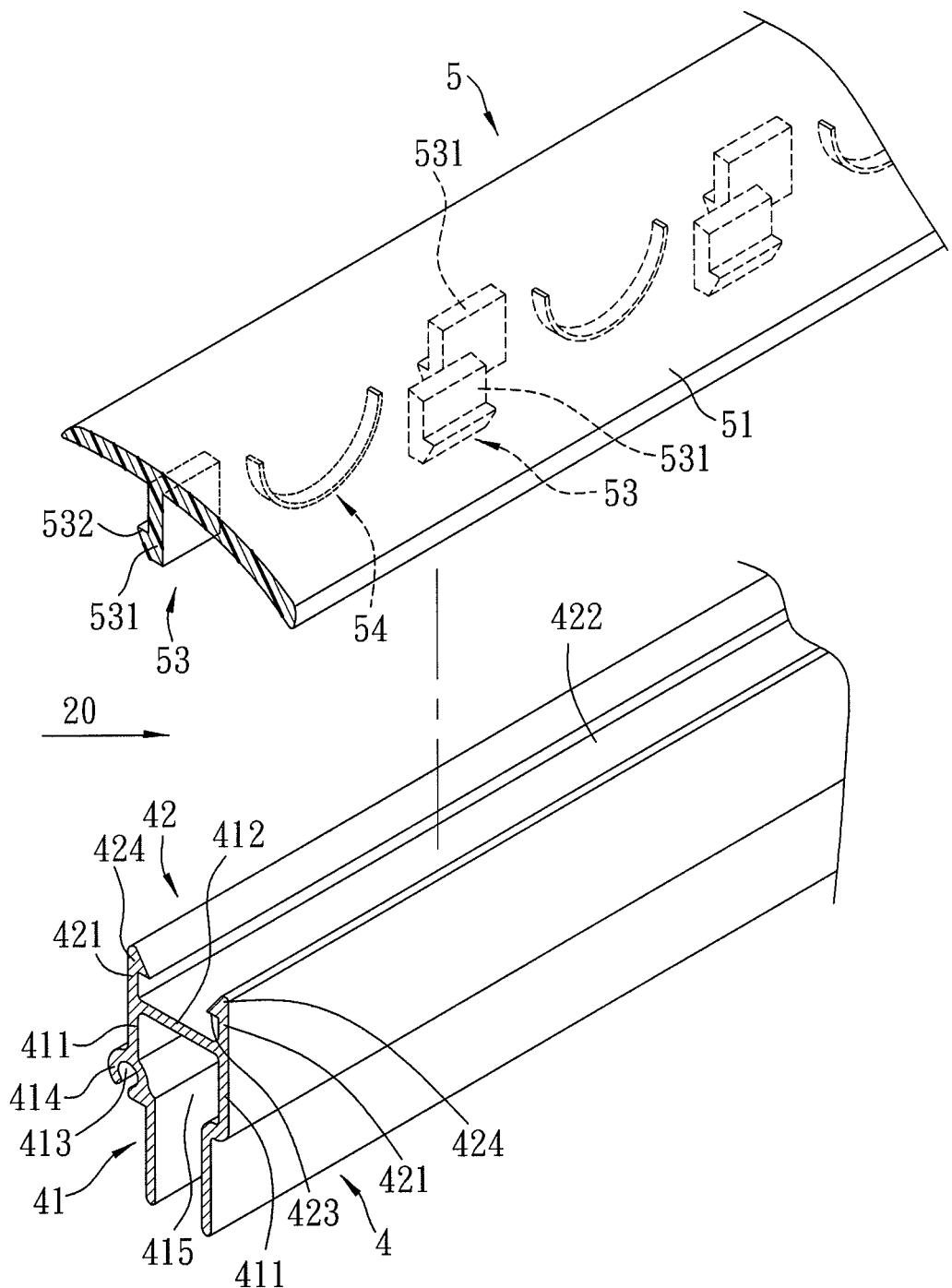
FIG. 5 is a fragmentary exploded sectional view of the first preferred embodiment.

As shown in FIGS. 3 to 5, a first preferred embodiment of a side bar device 20 according to the present invention is adapted to be connected to a sunshade assembly 2 for a rear windshield of an automobile, and includes a stationary seat 21, a retractable shade member 22, a shade-expanding mechanism 23, and a housing unit 3 that is formed with a slot 31. The shade member 22 has a free end portion 221 disposed in the housing unit 3 when the shade member 22 is retracted, and extending outwardly of the housing unit 3 through the slot 31 when the shade member 22 is expanded. The shade-expanding mechanism 23 is disposed for retracting and expanding the shade member 22, and includes a pair of shade-expanding members 231 adjacent to the free end portion 221 of the shade member 2. Since the feature of this invention does not reside in the specific configuration of the shade-expanding mechanism 23, which are known in the art, further details of the same are omitted herein for the sake of brevity. The side bar device 20 includes a side bar member 4 and a cover member 5.

The side bar member 4 has a shade-connecting portion 41 and a cover-connecting portion 42. The cover-connecting portion 42 has a pair of side walls 421 parallel to the slot 31 of the housing unit 3, and an intermediate wall 412 interconnecting the side walls 421 and cooperating with the side walls 421 to define an engaging space 422 thereamong. Each of the side walls 421 has an engaging wall section 424 extending inwardly toward the other one of the side walls 421 and having an engaging surface 423 that faces and substantially parallel to the intermediate wall 412. The shade-connecting portion 41 has a pair of side connecting walls 411 extending respectively from the side walls 421 in a direction opposite to that of the side walls 421, and defining cooperatively an engaging groove 415 that is engaged with the shade-expanding members 231 of the shade-expanding mechanism 23. The shade-connecting portion 41 further has a shade-connecting wall 414 extending outwardly from one of the side connecting walls 411 and cooperating with the one of the side connecting walls 411 to define a shade groove 413 for retaining the free end portion 221 of the shade member 22.

The cover member 5 has a coupling segment 52 that is coupled removably to the shade-connecting portion 41 of the side bar member 4, and that extends into the slot 31 when the shade member 22 is retracted, and a cover segment 51 that is disposed outside the housing unit 3 to cover the slot 31 when the shade member 22 is expanded for avoiding ambient dust from falling into the housing unit 3 through the slot 31.

Preferably, the cover segment 51 has a width in a transverse direction perpendicular to the slot 31 that is larger than that of the slot 31, and has a pair of end parts overlapping the housing unit 3 at portions adjacent to opposite ends of the slot 31 in the transverse direction, respectively. Each of the end parts of the cover segment 51 has a width (w) in the transverse direction not smaller than 3 mm.

In this embodiment, the coupling segment 52 has a plurality of spaced-apart engaging units 53 and abutment components 54 arranged alternately and parallel to the slot 31. Each of the engaging units 53 has a pair of engaging members 531 extending removably into the engaging space 422 and engaging respectively and removably the side walls 421 of the cover-connecting portion 42 of the side bar member 4. Each of the engaging members 531 has a coupling surface 532 abutting separably against the engaging surface 423 of the engaging wall section 424 of a respective one of the side walls 421. Each of the abutment components 54 is semicircular in shape, and projects from the cover segment 51 to abut separably against the intermediate wall 412 to ensure that the cover member 5 can be coupled firmly to the side bar member 4.

In the assembling of the sunshade assembly 2, the side bar member 4, the shade member 22 and the shade-expanding mechanism 23 are first assembled together and mounted in the housing unit 3, and the cover member 5 is then placed outside the housing unit 3 at a position corresponding to the slot 31 with the coupling segment 52 extending into the slot 31 and coupled to the cover-connecting portion 42 of the side bar member 4. As such, the sunshade assembly 2 can be applied to automobiles that have integrally-formed housing units 3. Compared to the conventional sunshade assembly 1 disclosed in the prior art, the sunshade assembly 2 with the side bar device 20 of this invention has a greater flexibility in use.

Figure 6:
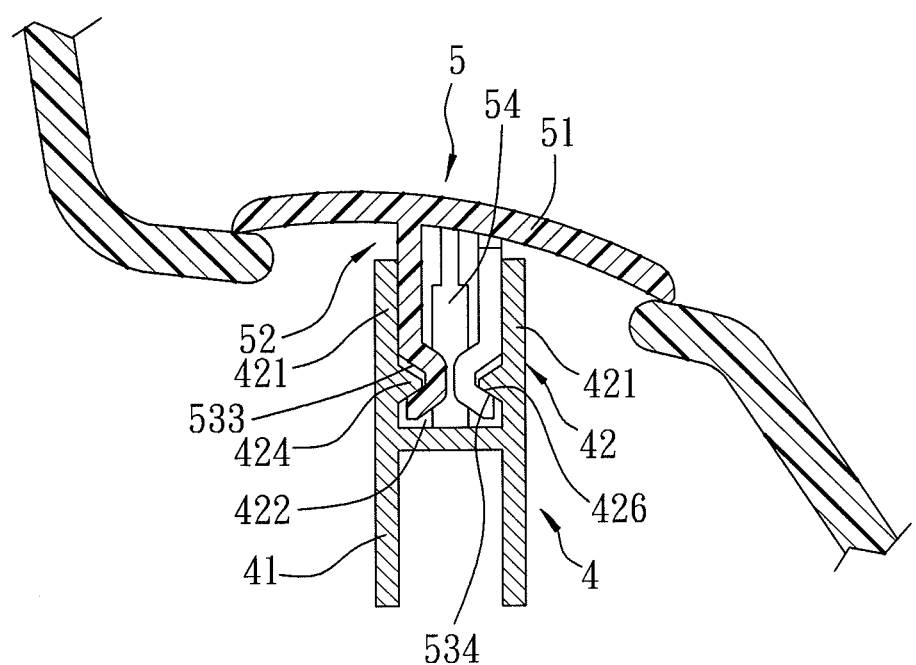
FIG. 6 is a fragmentary sectional view of the sunshade assembly mounted with a second preferred embodiment of the side bar device according to the invention.
Figure 7:
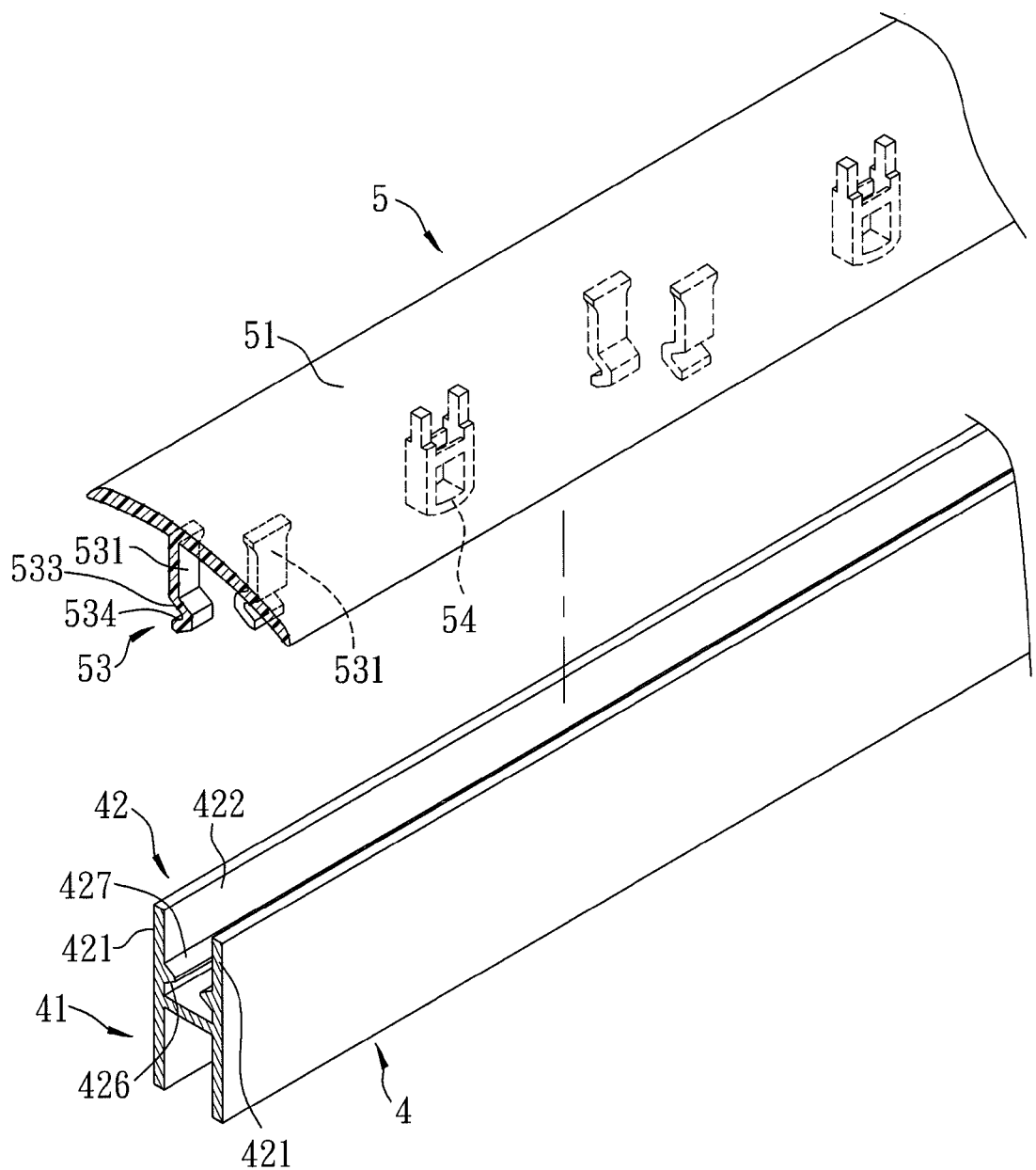
FIG. 7 is a fragmentary exploded sectional view of the second preferred embodiment.

As shown in FIGS. 6 and 7, the second preferred embodiment of the side bar device 20 according to the present invention has a structure similar to that of the first embodiment. The main difference between this embodiment and the previous embodiment resides in the following. In this embodiment, each of the engaging wall sections 424 extends inwardly from the respective one of the side walls 421, is located adjacent to the intermediate wall 412, and has an upper oblique surface 427 and a lower oblique surface 426. Each of the engaging members 531 of the engaging units 53 of the cover member 5 has a first coupling surface 533 and a second coupling surface 534 abutting separably and respectively against the upper and lower oblique surfaces 427, 426. The second preferred embodiment has the same advantages as those of the first preferred embodiment.

Figure 8:
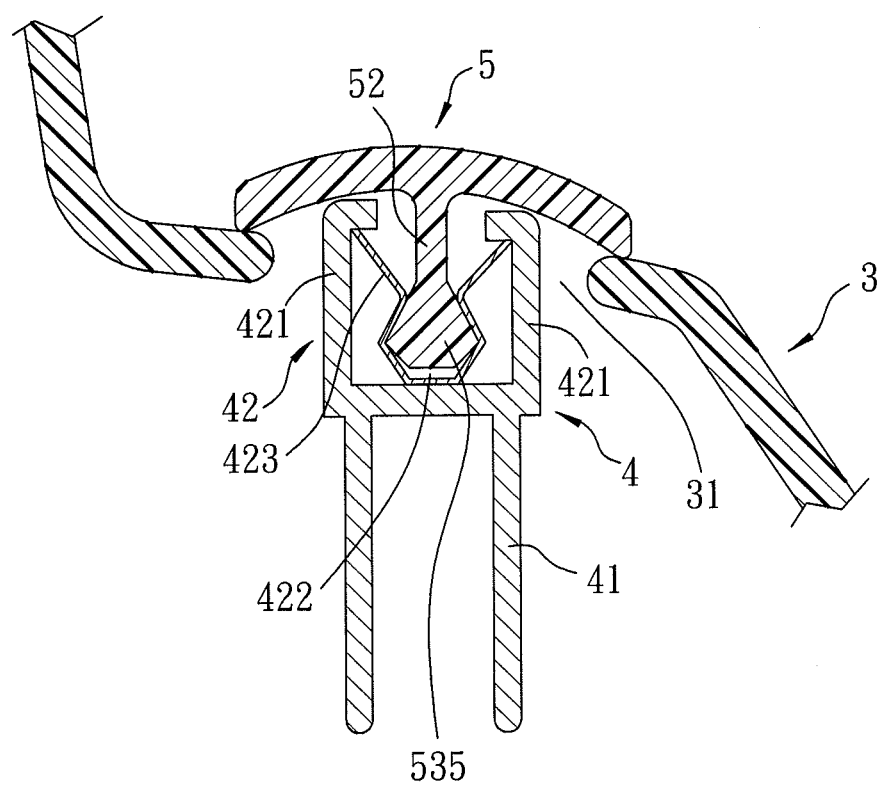
FIG. 8 is a fragmentary sectional view of the sunshade assembly mounted with a third preferred embodiment of the side bar device according to the invention.

As shown in FIG. 8, the third preferred embodiment of the side bar device 20 according to the present invention has a structure similar to that of the first preferred embodiment. The main difference between this embodiment and the first preferred embodiment resides in the following. In this embodiment, the cover-connecting portion 42 of the side bar member 4 has a pair of side walls 421 extending parallel to the slot 31 of the housing unit 3, and an engaging component 423 disposed between the side walls 421 and defining the engaging space 422 therein. The engaging component 423 is configured as a resilient clip. The coupling segment 52 of the cover member 5 has an engaging block 535 engaging removably the engaging space 422.

Figure 9:
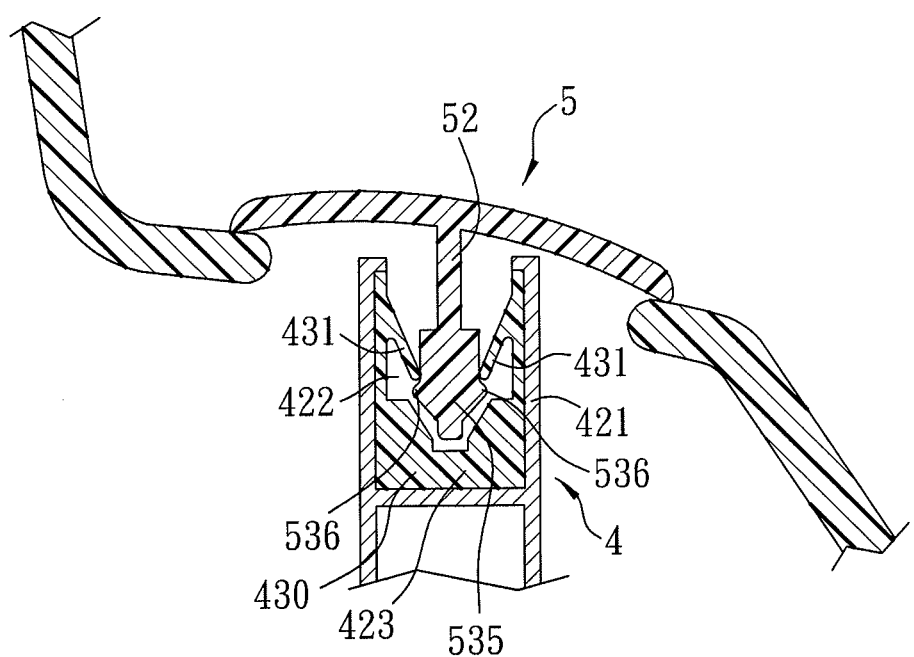
FIG. 9 is a fragmentary sectional view of the sunshade assembly mounted with a fourth preferred embodiment of the side bar device according to the invention.

Referring to FIG. 9, the fourth preferred embodiment of the side bar device 20 according to the present invention has a structure similar to that of the third preferred embodiment. The main difference between this embodiment and the first preferred embodiment resides in the following. The engaging component 423 has a rigid body 430 disposed between the side walls 421, and a pair of inwardly-projecting resilient plates 431 cooperating with the rigid body 430 to define the engaging space 422. The engaging block 535 of the coupling segment 52 of the cover member 5 extends removably into the engaging space 422 and has a pair of protrusions 536 disposed under and abutting against distal ends of the resilient plates 431, respectively. The fourth preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A side bar device adapted to be connected to a retractable shade member of a sunshade assembly, the sunshade assembly including a housing unit that is formed with a slot, the shade member having a free end portion that is disposed in the housing unit when the shade member is retracted and to extend outwardly of the housing unit through the slot when the shade member is expanded, said side bar device comprising:

a side bar member adapted to be connected to the free end portion of the shade member, said side bar member has a cover-connecting portion that has a pair of side walls parallel to the slot of the housing unit of the sunshade assembly and define cooperatively an engaging space therebetween; and a cover member having a coupling segment that is coupled removably to said side bar member, said coupling segment of said cover member has at least one pair of engaging members extending removably into said engaging space and engaging respectively and removably said side walls of said cover-connecting portion, and a cover segment that is adapted to be disposed outside the housing unit to cover separably the slot of the housing unit when the shade member is retracted.

2. The side bar device as claimed in claim 1, wherein:

said cover-connecting portion of said side bar member further includes an intermediate wall interconnecting said side walls; and said coupling segment of said cover member further has at least one abutment component that extends from said cover segment and that abuts separably against said intermediate wall.

3. The side bar device as claimed in claim 2, wherein:

each of said side walls of said side bar member has an engaging wall section extending toward the other one of said side walls and having an engaging surface that faces said intermediate wall; and each engaging member of said cover member has a coupling surface abutting separably against said engaging surface of said engaging wall section of a respective one of said side walls.

4. The side bar device as claimed in claim 2, wherein: each of said side walls of said side bar member has an engaging wall section extending toward the other one of said side walls and having an upper oblique surface and a lower oblique surface; and each engaging member of said cover member has a first coupling surface and a second coupling surface abutting separably and respectively against said upper and lower oblique surfaces.

5. The side bar device as claimed in claim 2, the sunshade assembly further including a shade-expanding mechanism for retracting and expanding the shade member, wherein said side bar member further has a shade-connecting portion that is connected to said cover-connecting portion and that has a pair of side connecting walls defining cooperatively an engaging groove adapted to be engaged with the shade-expanding mechanism; and a shade-connecting wall extending outwardly from one of said side connecting walls and cooperating with said one of said side connecting walls to define a shade groove adapted for retaining the free end portion of the shade member.

6. A side bar device adapted to be connected to a retractable shade member of a sunshade assembly, the sunshade assembly including a housing unit that is formed with a slot, the shade member having a free end portion that is disposed in the housing unit when the shade member is retracted and to extend outwardly of the housing unit through the slot when the shade member is expanded, said side bar device comprising:

a side bar member adapted to be connected to the free end portion of the shade member, said side bar member has a cover-connecting portion that has a pair of side walls extending parallel to the slot of the housing unit of the sunshade assembly, and an engaging component disposed between said side walls and defining an engaging space therein; and a cover member having a coupling segment that is coupled removably to said side bar member, and has an engaging block engaging removably said engaging space, and a cover segment that is adapted to be disposed outside the housing unit to cover separately the slot of the housing unit and the shade member is retracted.

7. The side bar device as claimed in claim 6, wherein said engaging component is configured as a resilient clip.

8. The side bar device as claimed in claim 6, wherein:

said engaging component of said side bar member has a pair of inwardly-projecting resilient plates; and said engaging block of said cover member has a pair of protrusions disposed under and abutting against distal ends of said resilient plates, respectively.

* * * * *